United States Patent [19]
Koyama

[11] Patent Number: 5,293,371
[45] Date of Patent: Mar. 8, 1994

[54] OPTICAL HEAD FOR A MAGNETO-OPTICAL INFORMATION REPRODUCING APPARATUS INCLUDING A LIGHT BEAM SPLITTER HAVING A FIRST GLASS, A UNIAXIAL CRYSTAL AND A SECOND GLASS ARRANGED IN SEQUENCE

[75] Inventor: Osamu Koyama, Kawasaki, Japan

[73] Assignee: Canon Kabushiki Kaisha, Tokyo, Japan

[21] Appl. No.: 733,161

[22] Filed: Jul. 19, 1991

[30] Foreign Application Priority Data

Jul. 26, 1990 [JP] Japan ................................ 2-196105

[51] Int. Cl.$^5$ .................... G11B 11/12; G11B 7/14; G11B 7/12
[52] U.S. Cl. .................... 369/110; 369/112; 369/13; 360/114
[58] Field of Search ............ 369/112, 13, 100, 110, 369/111, 121, 124; 360/114

[56] References Cited

U.S. PATENT DOCUMENTS

| | | | |
|---|---|---|---|
| 4,803,579 | 2/1989 | Koyama | 360/114 |
| 4,813,032 | 3/1989 | Koyama | 369/13 |
| 4,953,124 | 8/1990 | Koyama | 365/124 |
| 5,029,154 | 7/1991 | Sumi et al. | 369/112 |
| 5,029,261 | 7/1991 | Koyama et al. | 250/201.5 |
| 5,051,575 | 9/1991 | Hino | 250/225 |
| 5,077,723 | 12/1991 | Yoshimatsu | 369/110 |
| 5,084,856 | 1/1992 | Henmi et al. | 369/116 |
| 5,187,543 | 2/1993 | Ebert | 356/349 |

FOREIGN PATENT DOCUMENTS

3938639 5/1990 Fed. Rep. of Germany.

OTHER PUBLICATIONS

Patent Abstracts of Japan, Kokai No. 63-149842, vol. 12, No. 413, Nov. 1988.
Patent Abstracts of Japan, Kokai No. 01-138632, vol. 13, No. 391, Aug. 1989.

*Primary Examiner*—Hoa T. Nguyen
*Attorney, Agent, or Firm*—Fitzpatrick, Cella, Harper & Scinto

[57] ABSTRACT

In an optical head for a magneto-optical information reproducing apparatus, a light beam from a semiconductor laser is focused to a fine spot onto a magneto-optical recording medium. The light beam reflected by the recording medium is split by a splitting device into a first light beam having a polarization component in a direction of substantially 45 degrees with respect to a polarization direction of the semiconductor laser, and into a second light beam having a polarization component in a direction orthogonal to the above direction. The light beam splitting device includes an arrangement of a first glass, a uniaxial crystal and a second glass arranged in this sequence in the direction of incidence of the light beam. Normal lines to joint planes of the first glass and the uniaxial crystal, and the second glass and the uniaxial crystal, respectively, are in the plane in which the first and second light beams are contained, and the optical axis of the uniaxial crystal is set at substantially 45 degrees with respect to the polarization direction of the semiconductor laser.

9 Claims, 6 Drawing Sheets

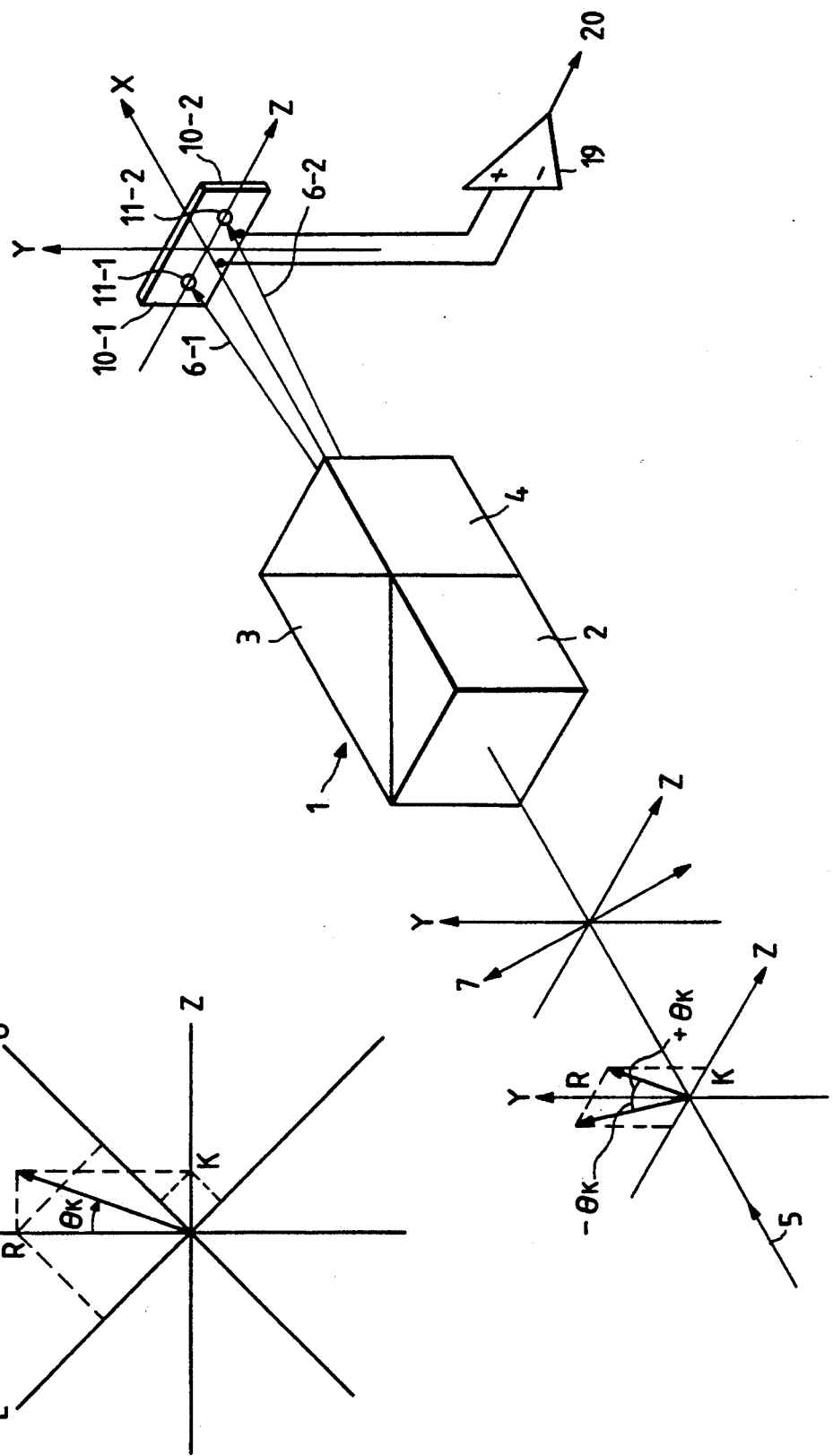

OPTICAL HEAD FOR A MAGNETO-OPTICAL INFORMATION REPRODUCING APPARATUS INCLUDING A LIGHT BEAM SPLITTER HAVING A FIRST GLASS, A UNIAXIAL CRYSTAL AND A SECOND GLASS ARRANGED IN SEQUENCE

BACKGROUND OF THE INVENTION

1. Field of the Invention

The present invention relates to an optical head for a magneto-optical information reproducing apparatus for reproducing information magnetically recorded on a magneto-optical recording medium by utilizing a magneto-optical effect.

2. Related Background Art

The study and development of an optical memory for recording and reproducing information by a semiconductor laser beam for use as a high record density memory have recently been vigorously done, and particularly a magneto-optical recording medium which permits erasing and rewriting of information is considered promising. In the magneto-optical recording medium, information is magnetically recorded by utilizing a local temperature rise on a magnetic thin film by spot irradiation of a laser beam, and the information is reproduced by a magneto-optical effect (particularly, a Kerr effect). The Kerr effect is defined as a phenomenon in which a polarization plane is rotated when light is reflected by a magnetic recording medium.

In a prior art optical head for the magneto-optical reproducing apparatus, a construction of an optical head which uses a crystal is explained as means for reproducing the information.

In an optical head 101 shown in FIG. 1, a light beam from a semiconductor laser 102 is collimated by a collimator lens 103, reflected by a beam splitter 104, and focused by an objective lens 105 onto a magneto-optical disk 106 which is a magneto-optical recording medium. The light beam reflected by the magneto-optical disk 106 passes through the objective lens 105 and the beam splitter 104 and is split by a beam splitter 107 into two light beams, a reflected beam and a transmitted beam. The reflected beam is directed to a servo error detection photo-sensor 109 through a lens 108. The photo-sensor 109 produces a detection signal in accordance with a shape of a spot on a photo-sensing area and supplies it to a servo error signal generator 112, which in turn produces a focusing error signal and a tracking error signal which are used to drive the objective lens 105 to a desired position by an actuator (not shown).

On the other hand, the light beam transmitted through the beam splitter 107 is directed to a one-half wavelength plate 111, split by a wallastone prism 113 into two light beams having orthogonal polarization components, and they are directed to a photo-detector 115 through a lens 114. The photo-detector 115 has two detectors for the above two light beams, and produces two detection output signals representing the changes in the respective polarization components and supplies them to a reproduced signal detector 116, which compares the two detection output signals to detect a rotation (Kerr rotation of the polarization plane of the light beam caused in the reflection by the vertically magnetized film of the magneto-optical disk 106 so that a reproduction signal representing the rotation is produced.

Referring to FIGS. 2 and 3, a principle of the two-beam split by the wallastone prism 113 is explained. The wallastone prism 113 is constructed by joining a quartz 120 having an optical axis 130 parallel to a Y-axis and a quartz 121 having an optical axis 131 parallel to a Z-axis. An incident light which travels along an X-axis is a linearly polarized light which is polarized in an XY plane. The one-half wavelength plate 111 is set to rotate the polarization direction of the incident light by 45 degrees.

FIG. 3 shows a sectional view of the prior art wallastone prism 113 shown in FIG. 2. When the incident light polarized in the direction of 45 degrees with respect to the Y-axis travels from the quartz 120 to the quartz 121, a projection component to the Y-axis is sequentially subjected to the actions of an extraordinary light refractive index and an ordinary light refractive index and exits as a linearly polarized light 122 polarized in the XY-plane. On the other hand, a projection component of the incident light to the Z-axis is sequentially subjected to the actions of the ordinary light refractive index and the extraordinary light refractive index, and exits as a linearly polarized light 123 which is polarized in a plane orthogonal to the XY plane. Thus, the incident light which is polarized in the direction of 45 degrees with respect to the Y-axis exits as the two linearly polarized lights 122 and 123 which are orthogonal to each other and have the same intensity. The polarization direction of the light beam reflected by the magneto-optical disk 106, prior to the entrance into the one-half wavelength plate 111 is deviated from the Y-axis by $\theta_K$ or $-\theta_K$ due to the influence of the Kerr effect. When the polarization direction of the incident light periodically changes between the direction corresponding to $\theta_K$ and the direction corresponding to $-\theta_K$, the two exit lights 122 and 123 have the same amplitude and opposite phases. Accordingly, by differentiating the outputs from the detectors for the two exit lights, a light intensity variation (noise) due to a foreign material on the magneto-optical disk is illuminated and a C/N ratio of the reproduced signal is improved.

However, in the above example, the following problems arise. First, the beam splitter 107 is required to produce the light beam for generating the servo signal and the light beam for generating the reproduction signal. Secondly, the one-half wavelength plate 111 is required to set the desired polarization direction of the light beam applied to the wallastone prism 113. Thirdly, a large number of steps are required for the adjustment of the angle of the one-half wavelength plate 111.

SUMMARY OF THE INVENTION

In light of the above, it is an object of the present invention to provide an optical head for a magneto-optical information reproducing apparatus which permits the reproduction of a high quality signal by the use of a crystal element and facilitates the reduction of weight, size and thickness.

It is another object of the present invention to provide an optical head for a magneto-optical information reproducing apparatus which permits cost reduction by reducing the number of parts.

In accordance with the optical head for the magneto-optical information reproducing apparatus of the present invention, a light beam from a semiconductor laser is focused to a fine spot on a magneto-optical recording means, and the light beam reflected by the recording medium is split by split means to a first light beam having a polarization component in a direction of substantially 45 degrees with respect to the polarization direction of the semiconductor laser, and to a second light beam having a polarization component in a direction orthogonal to the above direction. The light beam split means includes an arrangement of a first glass, a uniaxial crystal and a second glass arranged in this sequence in the direction of the incidence of the light beam, and normal lines to the joint planes of the first glass and the uniaxial crystal, and the second glass and the uniaxial crystal, respectively, are in the plane in which the first and second light beams are contained, and the optical axis of the uniaxial crystal is set at substantially 45 degrees with respect to the polarization direction of the semiconductor laser.

BRIEF DESCRIPTION OF THE DRAWINGS

FIGS. 4 and 5 show a perspective view and a front view for illustrating a function of a light beam split element of the present invention.

DETAILED DESCRIPTION OF THE PREFERRED EMBODIMENTS

Figure 1:
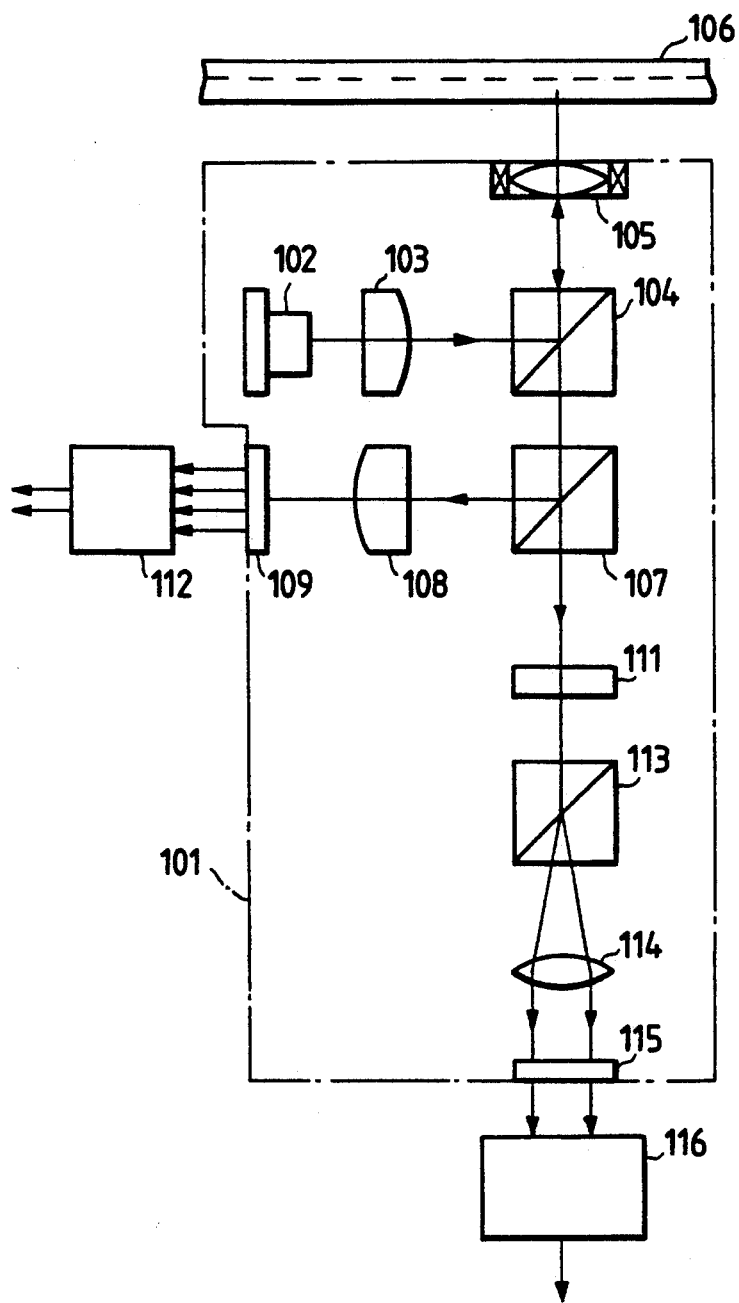
FIGS. 1, 2 and 3 show prior art techniques.
Figure 2:
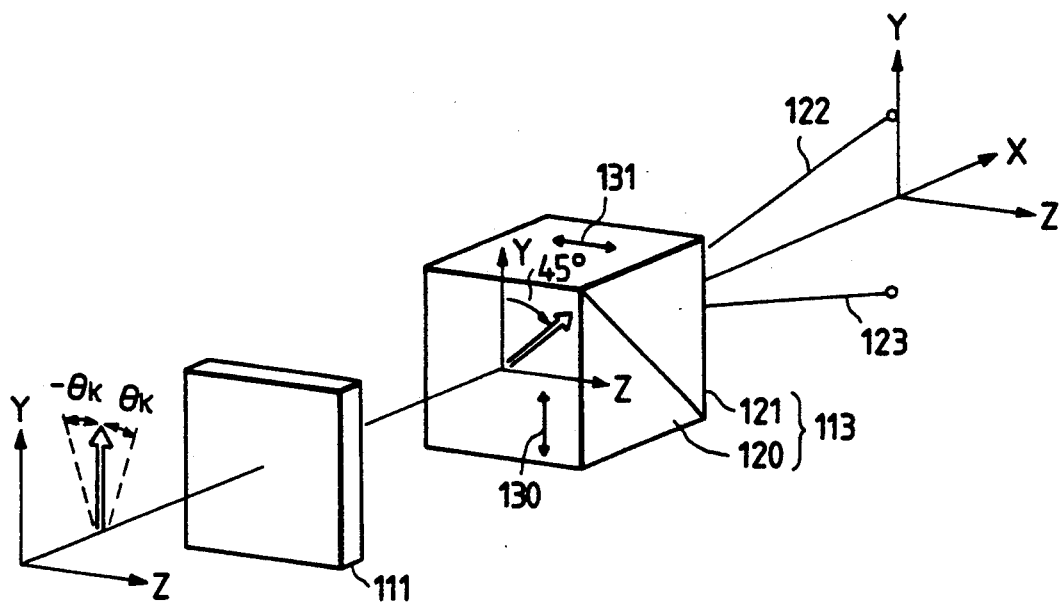
Figure 3:
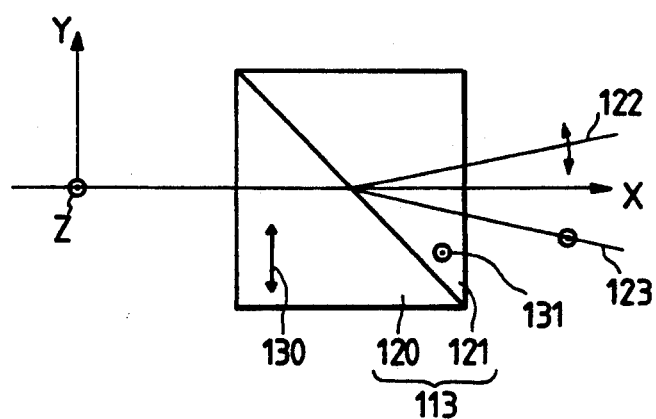

In a magneto-optical information reproducing apparatus, a spot light from a semiconductor laser, which is a light source, is irradiated to a magnetic thin film of a magneto-optical recording medium, information is recorded on the recording medium by a local temperature rise of the recording medium, and the information is reproduced by a magneto-optical effect (particularly, a Kerr effect). The Kerr effect is defined as a phenomenon in which a polarization plane is rotated when the light is reflected by the magneto-optical recording medium. A principle of reproduction of the information by utilizing the magneto-optical effect is explained with reference to FIGS. 4 and 5. An optical element 1 which comprises light beam split means for splitting the light beam reflected by the recording medium comprises a first glass 2, a uniaxial crystal 3 and a second glass 4 which are arranged in this sequence in the direction of incidence. A light beam 5 applied to the optical element 1 is a linearly polarized light which is emitted by a semiconductor laser and reflected by the recording medium, and has a polarization plane thereof rotated by a small angle $\pm\theta_K$ with respect to a Y-axis depending on the presence or absence of the information recorded by the Kerr effect. An optical axis 7 of the uniaxial crystal 3 is set in the direction of 45 degrees with respect to the Y-axis and has an extraordinary light refractive index $n_E$ in the direction of the optical axis and an ordinary light refractive index $n_O$ in a direction orthogonal to the above direction. The direction of the optical axis 7 of the uniaxial crystal 3 is in the direction of substantially 45 degrees with respect to the polarization direction of the semiconductor laser which is the light source. The normal lines to the joint planes of the first glass 2 and the uniaxial crystal 3, and the second glass 4 and the uniaxial crystal 3, respectively, are in the plane in which the two light beams 6-1 and 6-2 are contained.

As shown in FIG. 5, the direction of the optical axis of the uniaxial crystal 3 is represented by an E-axis, and a direction orthogonal thereto is represented by an O-axis. The incident light beam 5 is reduced to two orthogonal amplitude components, a Fresnel component R and a Kerr component K. A relationship between R, K and the Kerr rotation angle is represented by:

$$\tan(\pm\theta_K) = \pm K/R \tag{1}$$

When the Kerr rotation angle is $\pm\theta_K$, the following relation is met;

$$U_E(\pm) = 1/\sqrt{2} \ (R - \pm K) \tag{2}$$

$$U_O(\pm) = 1/\sqrt{2} \ (R \pm K) \tag{3}$$

where $U_E(\pm)$ and $U_O(\pm)$ are amplitude components projected to the E-axis and the O-axis, respectively.

The light beams of the respective amplitude components cause different differences of refractive indices $n_E$-n and $n_O$-n at the interfaces of the glasses 2 and 4 (having the refractive index n) and the uniaxial crystal 3. Thus, they are split into two light beams 6-1 and 6-2 in accordance with Snell's law (see FIG. 4). They are detected by photo-detectors 10-1 and 10-2.

The two light beams comprise a first light beam having a polarization component in the direction of substantially 45 degrees with respect to the polarization direction of the semiconductor laser, and a second light beam having a polarization component in the direction orthogonal to the above direction.

Light intensities $I_1(\pm)$ and $I_2(\pm)$ (where the Kerr rotation is $\pm\theta_K$) of the light beams 11-1 and 11-2 on the photo-detectors are represented by:

$$I_1(\pm) = (U_E(\pm))^2 = \tfrac{1}{2}(R - \pm K)^2 \approx \tfrac{1}{2}R^2 - \pm RK \tag{4}$$

$$I_2(\pm) = (U_O(\pm))^2 = \tfrac{1}{2}(R \pm K)^2 \approx \tfrac{1}{2}R^2 \pm RK \tag{5}$$

where $R^2 >> K^2$.

By differentiating electrical outputs of the photo-detectors representing the intensities of the two light beams by a differential amplifier 19, a magneto-optical signal RF is produced.

$$RF \propto I_2(\pm) - I_1(\pm) = \pm 2RK \tag{6}$$

The photo-detectors 10-1 and 10-2 are also used to detect a servo signal (focusing and tracking signal) for positioning the fine light spot on the magneto-optical medium (not shown), in addition to the detection of the magneto-optical signal.

As the servo signal, the shape of the light beam or the light intensity distribution on the photo-detector is usually detected. To this end, the light beam is precisely positioned to the multi-divided photo-detector and the position of the light spot on the recording medium is controlled such that the operation values of the outputs of the respective photo-detectors reach the target values.

Figure 6A:
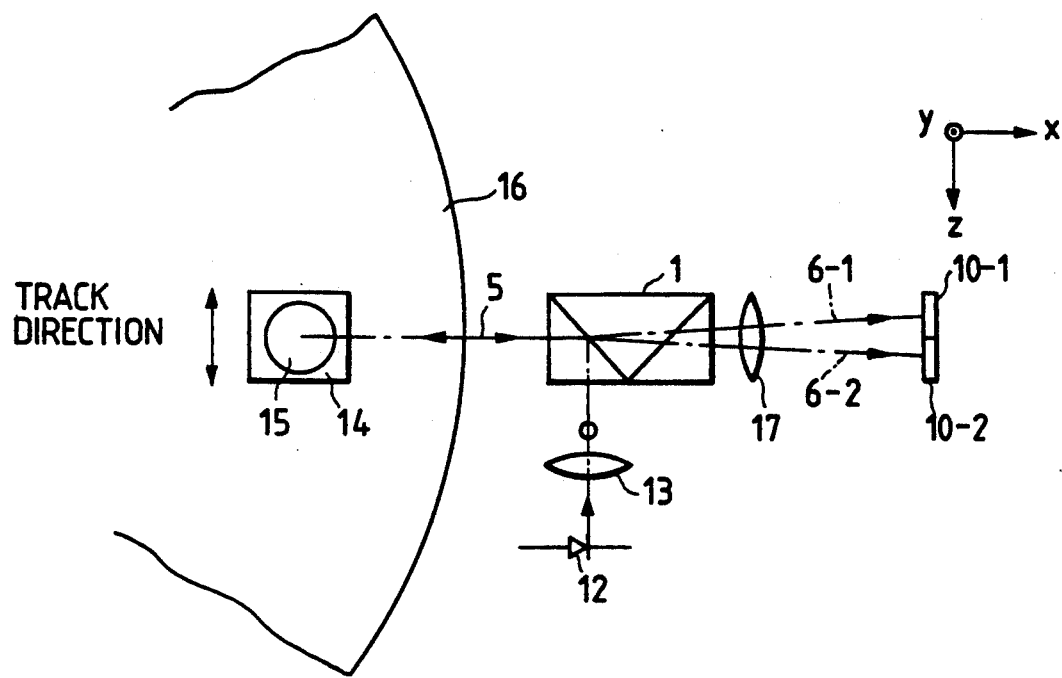
FIGS. 6A and 6B show a plan view and a side view of an optical head for a magneto-optical information reproducing apparatus which uses the light beam split element of the present invention.
Figure 6B:
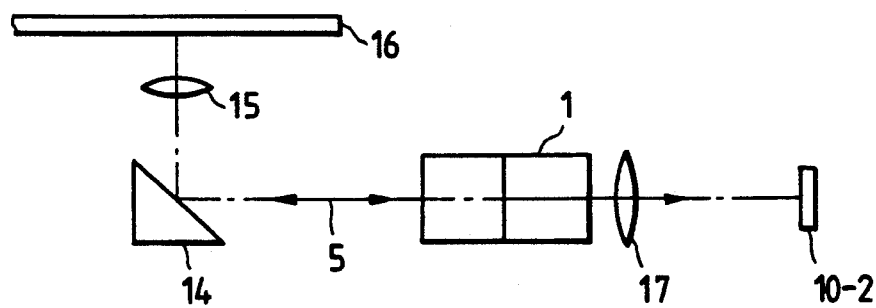

A magneto-optical information reproducing apparatus which uses the light beam split element 1 of the present invention is explained with reference to FIGS. 6A and 6B. In the light beam split element 1 of FIGS. 6A and 6B a polarization beam splitter is vapor-deposited on a joint plane of the glass 2 and the uniaxial crystal 3. In order to produce a good magneto-optical reproduction signal, a characteristic of the polarization beam splitter has a P polarization transmittance $t_p = 100\%$ and an S polarization transmittance $t_s = 20\%$.

The linearly polarized light beam emitted from the semiconductor laser 12 is collimated by a collimator lens 13. The polarization direction of the semiconductor laser is normal to the plane of the drawing in the front view (FIG. 6A). The light beam applied to the light beam split element 1 with the S polarization is reflected approximately 80% and it is directed to a mirror 14. The light beam reflected by the mirror 14 is focused by an objective lens 15 to a fine spot on a predetermined track of the recording medium. The light spot is positioned by an actuator (not shown) by driving the objective lens perpendicularly to the track and along the optical axis. The reflected light beam which contains the magneto-optical signal information on the recording medium 16 is collimated by the objective lens 15, deflected by the mirror 14 and again directed to the light beam split element 1. The magneto-optical signal information is converted to a P polarization component by the light beam split element 1. In the polarization beam splitter, the P polarization component is transmitted substantially 100% and the S polarization component is transmitted 20% Accordingly, the Kerr rotation angle is amplified so that a high S/N ratio is attained.

As described above, the incident light beam is split to the light beams 6-1 and 6-2 having the two polarization components which are in the direction of substantially 45 degrees with respect to the polarization direction of the semiconductor laser and which are orthogonal to each other, by the joint planes of the glasses 2 and 4 and the uniaxial crystal 3. The light beams 6-1 and 6-2 are focused onto the photo-detectors 10-1 and 10-2 by a lens 17. The magneto-optical signal is produced from a differential output of the photo-detectors, and the servo signal is produced from at least one of the photo-detectors.

The present embodiment is featured by the not needing the one-half wavelength plate and the formation of the servo signal detection light beam 6-1 and the reproduction signal detection light beam 6-2 by the single optical element, that is, the light beam split element 1. The present invention attains a reduction of the number of parts and a reduction of the number of assembling and adjusting steps compared to those of the prior art optical head.

As described above, the shape or the light intensity distribution of the light beam on the photo-detector is usually detected as the servo signal. To this end, the light beam is precisely positioned on the multi-divided photo-detectors and the position of the light spot is controlled such that the operation values of the outputs of the respective photo-detectors reach the target values.

Accordingly, it is important in the reproduction of the magneto-optical signal at a high quality that those target values do not change under any environment with regard to the position of the light spot on the recording medium.

Accordingly, it is necessary to consider the wavelength dependency (scattering) of the refractive indices of the uniaxial crystal 3 and the glasses 2 and 4. This is explained with reference to FIGS. 7 and 8.

Figure 7:
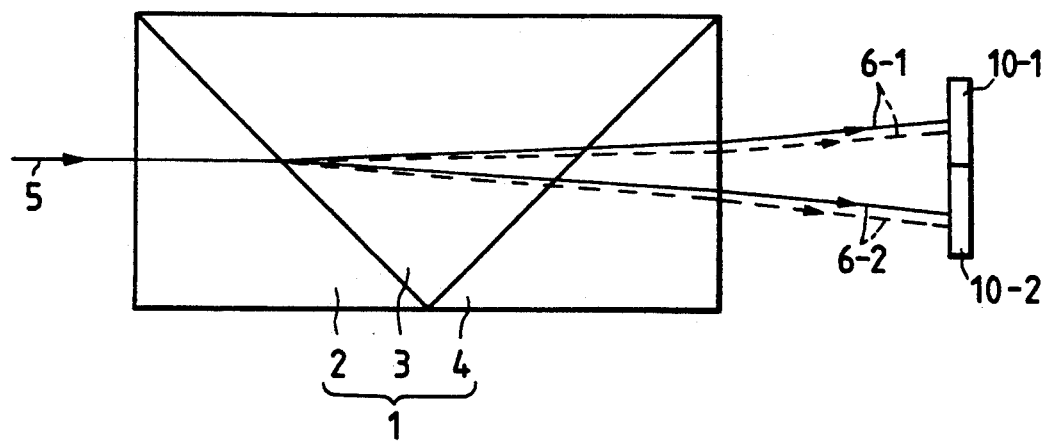
FIGS. 7 and 8 illustrate a change of a light path when a wavelength is varied.
Figure 8:
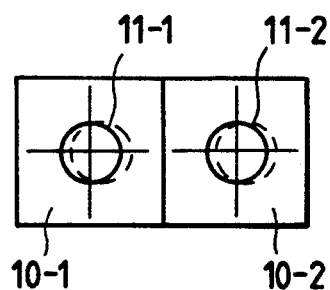

In FIG. 7, numerals 6-1 and 6-2 denote two light beams split by the optical element 1. Solid lines show light paths of projected images 11-1 and 11-2 when the light beams 6-1 and 6-2 are precisely positioned on the photo-detectors. For example, when 4-split sensors are used as the photo-detectors 10-1 and 10-2 and they are exactly positioned on the split lines as shown in FIG. 8, the operation values at the outputs of the respective photo-detectors are the target values of control, and the light spot on the recording medium is correctly focused and tracked on the desired track.

It should be noted here that the semiconductor laser (not shown) which is used as the light source usually has a characteristic by which a wavelength varies with temperature and an output. The wavelength-temperature characteristic is normally $0.2 \sim 0.3$ nm/° C. Under the environment of room temperature $\pm 30°$ C., the waveform variation of $12 \sim 18$ nm is included. When the magneto-optical signal is recorded or erased, the output changes from approximately 3 mW to approximately 30 mW, and the variation of wavelength is normally $3 \sim 6$ nm. As the wavelength of the semiconductor laser changes, the extraordinary light refractive index $n_0$ of the uniaxial crystal 3 and the refractive index n of the glasses 2 and 4 also vary. As a result, the light path changes as shown by broken lines in FIGS. 7 and 8 and the positions of the projected images 11-1 and 11-2 of the light beams on the photo-detectors are shifted. As a result, offsets are created in the focusing and the tracking depending on the servo system, and a cross-stroke between the focusing and the tracking increases.

These are serious problems in exactly reproducing the magneto-optical signal.

In the optical head for the magneto-optical information reproducing apparatus which uses the light beam split element formed by the crystal and the two glasses in accordance with the present invention, it is desired that the change in the light beam exit angle from the light beam split element is sufficiently small so that the magneto-optical signal information is correctly and stably reproduced even if the wavelength of the semiconductor laser which is the light source varies with the temperature or the output.

In accordance with an embodiment of the optical head for the magneto-optical information reproducing apparatus, the light beam from the semiconductor laser is focused to a fine spot on the magneto-optical recording medium, and the light beam reflected by the record medium is split by the light beam separation means to a first light beam having a polarization direction which is in the direction of approximately 45 degrees with respect to the polarization direction of the semiconductor laser, and to a second light beam having a polarization component which is orthogonal to the above direction. The light beam split means comprises a first glass, a uniaxial crystal and a second glass arranged in this sequence along the direction of incidence of the light beam. Normal lines to the joint planes of the first glass and the uniaxial crystal, and the second glass and the uniaxial crystal, respectively, are in the plane in which the first and second light beams are contained, and the optical axis of the uniaxial crystal is set in the direction of approximately 45 degrees with respect to the polarization direction of the semiconductor laser. The first and second glasses and the uniaxial crystal have refractive indices, scatterings and joint angles such that the light beam exit angles from the light beam split means are equal for the first and second wavelengths of the semiconductor laser, for at least one of the first and second light beams.

In the above arrangement, the change in the light beam exit angle from the light beam split element is sufficiently small even if the wavelength of the semiconductor laser varies with the temperature or the output. As a result, the deviation of the light beam on the photodetector which detects the servo signal is small, and the magneto-optical signal information can be exactly and stably reproduced.

Figure 9:
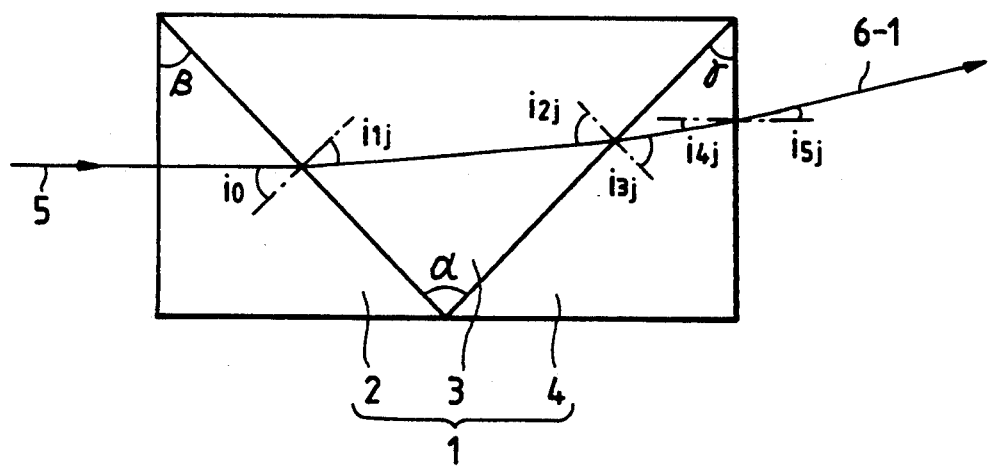
FIG. 9 shows a light beam split element of the present invention.

Another embodiment of the present invention is explained with reference to the drawings. In FIG. 9, the light beam split element 1 of the present invention comprises a first glass 2, a uniaxial crystal 3 and a second glass 4 arranged in this sequence in the direction of incidence of the light beam. A reflected light beam 5 from a magneto-optical recording medium (not shown) passes through the light beam split element 1. The direction of the Kerr rotation angle caused thereby is identical to that of FIG. 4. A basic structure of the light beam split element is identical to that of FIG. 4. One light beam 6-1 (the other is not shown) of the two light beams split by the light beam split element 1 is explained in detail. The explanation for the one light beam is equally applicable to the other light beam, and in the photodetectors 10-1 and 10-2 shown in FIG. 8, necessary servo signal information (for focusing and tracking) may be obtained by using either one of the light beams. Accordingly, the explanation for one light beam is sufficient to understand the present invention.

Assuming that the wavelength of the semiconductor laser is $\lambda_j$ (j=1, 2), the refractive index of the glass 2 is $n_{1j}$, the refractive index of the uniaxial crystal 3 is $n_{2j}$ and the refractive index of the glass 4 is $n_{3j}$ (where the argument j means first and second wavelengths), the following relations are met. While the uniaxial crystal 3 has an extraordinary light refractive index $n_E$ and an ordinary light refractive index $n_O$, $n_{2j}$ means one of them by the reason described above. An incident angle and an exit angle in the light beam split element 1 are represented by $i_{1j} \sim i_{5j}$ (j=1, 2). For the simplification of calculation, it is assumed that the light beam is applied perpendicularly to the light beam split element 1 and $i_0$ is constant for the first and second wavelengths, although the present invention is not limited thereto. An apex angle of 0 the uniaxial crystal is represented by $\alpha$, and apex angles of the glasses 2 and 4 are represented by $\beta$ and $\gamma$ ($\beta = i_0$).

By Snell's law, the following relations are met for the first wavelength $\lambda_1$.

$$n_{11} \sin i_0 = n_{21} \sin i_{11} \tag{7}$$

$$n_{21} \sin i_{21} = n_{31} \sin i_{31} \tag{8}$$

$$n_{31} \sin i_{41} = \sin i_{51} \tag{9}$$

$$i_{11} + i_{21} = \alpha \tag{10}$$

$$i_{31} + i_{41} = \gamma \tag{11}$$

Similarly, the following relations are met for the second wavelength $\lambda_2$.

$$n_{12} \sin i_0 = n_{22} \sin i_{12} \tag{12}$$

$$n_{22} \sin i_{22} = n_{32} \sin i_{32} \tag{13}$$

$$n_{32} \sin i_{42} = \sin i_{52} \tag{14}$$

$$i_{12} + i_{22} = \alpha \tag{15}$$

$$i_{32} + i_{42} = \gamma \tag{16}$$

Since it is desired that the following relation is met between the first wavelength and the second wavelength, $$i_{51} = i_{52} \tag{17}$$

the following relation is derived from equations (7), (8) and (10);

$$n_{31} \sin i_{31} = -n_{11} \cos \alpha \sin i_0 \pm \sin \alpha \cdot (n_{21}^2 - n_{11}^2 \sin^2 i_0)^{\frac{1}{2}} \equiv a_1 \tag{18}$$

From equations (12), (13) and (14);

$$n_{32} \sin i_{31} = -n_{12} \cos \alpha \sin i_0 \pm \sin \alpha \cdot (n_{22}^2 - n_{12}^2 \sin^2 i_0)^{\frac{1}{2}} \equiv a_2 \tag{19}$$

From equations (9), (11), (14), (16) and (17);

$$n_{31} \sin(\gamma - i_{31}) = n_{32} \sin(\gamma - i_{32}) \tag{20}$$

From equations (18), (19) and (20);

$$\tan \gamma = (a_1 - a_2)/\{(n_{31}^2 - a_1^2)^{\frac{1}{2}} - (n_{32}^2 - a_2^2)^{\frac{1}{2}}\} \tag{21}$$

The refractive indices and the scattering apex angles of the glasses 2 and 4 and the uniaxial crystal 3 are selected to meet equation (21). It has been proved through the study that there is no practical problem if the following condition is met in a conventional optical head.

$$|\{(n_{31}^2 - a_1^2)^{\frac{1}{2}} - (n_{32}^2 - a_2^2)^{\frac{1}{2}}\} \cdot \sin \gamma - (a_1 - a_2) \cos \gamma| \leq 2 \times 10^{-4} \tag{22}$$

A difference between the first wavelength $\lambda_1$ and the second wavelength $\lambda_2$ may be approximately $\pm 15$ nm taking the wavelength variation of $\pm 6 \sim \pm 9$ nm due to the temperature change of the semiconductor laser and the wavelength variation of $3 \sim 6$ nm due to the output change into consideration.

A first example is shown below.

Assuming that $\alpha = 90°$, $\beta = \gamma = 45°$, the equation (22) is simplified as follows.

$$|(n_{31}^2 - n_{21}^2 + n_{11}^2/2)^{\frac{1}{2}} - (n_{21}^2 - n_{11}^2/2)^{\frac{1}{2}} - (n_{32}^2 - n_{22}^2 + n_{12}^2/2)^{\frac{1}{2}} - (n_{22}^2 - n_{12}^2/2)^{\frac{1}{2}}| \leq 2 \times 10^{-4} \tag{23}$$

The glass material is selected to meet the following formula.

$$n_{3j} = (2n'_{2j}^2 - n_{1j}^2)^{\frac{1}{2}} \tag{24}$$

where (j=1, 2)

$$n'_{2j} = \tfrac{1}{2}(n_e + n_0) \tag{25}$$

As a result, the light beam exit angle of the light beam split element 1 is approximately zero degree, and the influence by the aberration is reduced even if the lens is arranged behind the light beam split element.

SK12 is used for the glass 2, quartz is used for the uniaxial crystal, and BK7 is used for the glass 4.

Assuming that $\lambda_1=790$ nm, and $\lambda_2=805$ nm, $n_{1j}\sim n_{3j}$ are given as follows.

|  | $\lambda_1 = 790$ nm | $\lambda_2 = 805$ nm |
|---|---|---|
| SK12 | $n_{11} = 1.57621$ | $n_{12} = 1.57586$ |
| Quartz (Extraordinary) | $n_{21} = 1.54749$ | $n_{22} = 1.54718$ |
| Quartz (Ordinary) | $n_{21} = 1.53859$ | $n_{22} = 1.53829$ |
| BK7 | $n_{31} = 1.51052$ | $n_{32} = 1.51022$ |

Similar data is shown for $i_{1j}\sim i_{5j}$ for the extraordinary light and the ordinary light (unit=degree). When it is applied to the equation (23), it is $3.16\times10^{-5}$ for the extraordinary light and $5.20\times10^{-5}$ for the ordinary light, and the angle is 6.5" for the extraordinary light and 10.8" for the ordinary light, which are small.

|  | Extraordinary | | Ordinary | |
|---|---|---|---|---|
| i | $\lambda_1 =$ 790 nm | $\lambda_2 =$ 830 nm | $\lambda_1 =$ 790 nm | $\lambda_2 =$ 830 nm |
| $i_0$ | 45.0000 | 45.0000 | 45.0000 | 45.0000 |
| $i_{1j}$ | 46.0735 | 46.0722 | 46.4186 | 46.4170 |
| $i_{2j}$ | 43.9265 | 43.9278 | 43.5814 | 43.5830 |
| $i_{3j}$ | 45.2931 | 45.2943 | 44.6034 | 44.6053 |
| $i_{4j}$ | 0.2931 | 0.2943 | −0.3967 | −0.3948 |
| $i_{5j}$ | 0.4427 | 0.4445 | −0.5992 | −0.5962 |
| $i_{51}-i_{52}$ | −0.0018 | | −0.0030 | |

In the first example, since the deviation of the exit light angle from the light beam split means 1 for the wavelength variation is small for both the extraordinary light and the ordinary light, either the photo-detector 10-1 or 10-2 may be used to detect the servo signal. Further, since the exit light angle is close to zero degree, aberration hardly occurs even if the lens (not shown) is arranged behind the light beam split element 1. Even if the material of the glasses 2 and 4 is changed, the substantially same characteristic is attained.

A second example is shown below. It is assumed that $\alpha=90°$ and $\beta=\gamma=45°$. PSK1 is used for the glasses 2 and 4 and quartz is used for the uniaxial crystal.

Assuming that $\lambda_1=790$ nm and $\lambda_2=805$ nm, $n_{1j}(=n_{3j})$ and $n_{2j}$ are given below.

|  | $\lambda_1 = 790$ nm | $\lambda_2 = 805$ nm |
|---|---|---|
| PSK1 | $n_{11} = 1.54149$ | $n_{12} = 1.54118$ |
| Quartz (Extraordinary) | $n_{21} = 1.54749$ | $n_{22} = 1.54718$ |
| Quartz (Ordinary) | $n_{21} = 1.53859$ | $n_{22} = 1.53829$ | where $n_{11}=n_{31}$ and $n_{12}=n_{32}$.

Similar data is shown for $i_{1j}\sim i_{5j}$ for the extraordinary light and the ordinary light.

|  | Extraordinary | | Ordinary | |
|---|---|---|---|---|
| i | $\lambda_1 =$ 790 nm | $\lambda_2 =$ 805 nm | $\lambda_1 =$ 790 nm | $\lambda_2 =$ 805 nm |
| $i_0$ | 45.0000 | 45.0000 | 45.0000 | 45.0000 |
| $i_{1j}$ | 44.7783 | 44.7782 | 45.1081 | 45.1077 |
| $i_{2j}$ | 45.2217 | 45.2218 | 44.8919 | 44.8923 |
| $i_{3j}$ | 45.4469 | 45.4470 | 44.7846 | 44.7853 |
| $i_{4j}$ | 0.4469 | 0.4470 | −0.2154 | −0.2147 |
| $i_{5j}$ | 0.6889 | 0.6889 | −0.3320 | −0.3309 |
| $i_{51}-i_{52}$ | $-2.8\times 10^{-7}$ | | −0.0011 | |

In the second example, the deviation of the exit light angle from the light beam split means 1 for the wavelength variation is also small for the extraordinary light and the ordinary light, and either the photo-detector 10-1 or 10-2 may be used to detect the servo signal. Further, since the exit light angle is close to zero degree, aberration hardly occurs even if the lens (not shown) is arranged behind the light beam split element 1.

A third example is shown below. It is assumed that $\alpha=90°$, $\beta=45°$ and $\gamma=43.183°$, and SK15 is used for the glass 2, quartz is used for the uniaxial crystal and FK5 is used for the glass 4.

Assuming that $\lambda_1=790$ nm and $\lambda_2=805$ nm, $n_{1j}\sim n_{3j}$ are given below.

|  | $\lambda_1 = 790$ nm | $\lambda_2 = 805$ nm |
|---|---|---|
| SK15 | $n_{11} = 1.61547$ | $n_{12} = 1.61509$ |
| Quartz (Extraordinary) | $n_{21} = 1.54749$ | $n_{22} = 1.54718$ |
| Quartz (Ordinary) | $n_{21} = 1.53859$ | $n_{22} = 1.53829$ |
| FK5 | $n_{31} = 1.48243$ | $n_{32} = 1.48217$ |

Similar data is shown for $i_{1j}\sim i_{5j}$ for the extraordinary light and the ordinary light (unit=degree).

|  | Extraordinary | | Ordinary | |
|---|---|---|---|---|
| i | $\lambda_1 =$ 790 nm | $\lambda_2 =$ 805 nm | $\lambda_1 =$ 790 nm | $\lambda_2 =$ 805 nm |
| $i_0$ | 45.0000 | 45.0000 | 45.0000 | 45.0000 |
| $i_{1j}$ | 47.5757 | 47.5735 | 47.9396 | 47.9371 |
| $i_{2j}$ | 42.4243 | 42.4265 | 42.0604 | 42.0629 |
| $i_{3j}$ | 44.7668 | 44.7677 | 44.0505 | 44.0522 |
| $i_{4j}$ | 1.5838 | 1.5847 | 0.8675 | 0.8692 |
| $i_{5j}$ | 2.3482 | 2.3492 | 1.2861 | 1.2883 |
| $i_{51}-i_{52}$ | −0.0010 | | −0.0022 | |

Since the light beam exit angle is given by $i_{5j}-(45-\gamma)$, the angle is $+0.53°$ for the extraordinary light and $-0.53°$ for the ordinary light.

In the third example, the deviation of the exit light angle from the light beam split means 1 for the wavelength variation is also small for the extraordinary light and the ordinary light, and either the photo-detector 10-1 or 10-2 may be used to detect the servo signal. Further, aberration hardly occurs even if the lens (not shown) is arranged behind the light beam split element 1.

The configuration of the magneto-optical information reproducing apparatus which uses the light beam split element 1 of the present invention is similar to that shown in FIG. 6.

The reflected light beam from the recording medium is split into the light beams 6-1 and 6-2 having two polarization components which are orthogonal to each other, at the joint planes of the glasses 2 and 4 and the uniaxial crystal 3. When the light beam split element of the first, second or third example is used, the split angle of the light beams is approximately 1 degree. The light beams 6-1 and 6-2 are focused by the lens 17 onto the photo-detectors 10-1 and 10-2. The magneto-optical signal is produced by the differential output of the photo-detectors, and the servo signal is produced by at least one of the photo-detectors. In the present apparatus, since the angle deviation of the light beams 6-1 and 6-2 split by the light beam split element 1 is very small, the deviation of the light beam on the photo-detector is small even if the wavelength of the semiconductor laser 12 varies with the temperature or the output, and stable and correct reproduction of the magneto-optical signal is attained.

Figure 10:
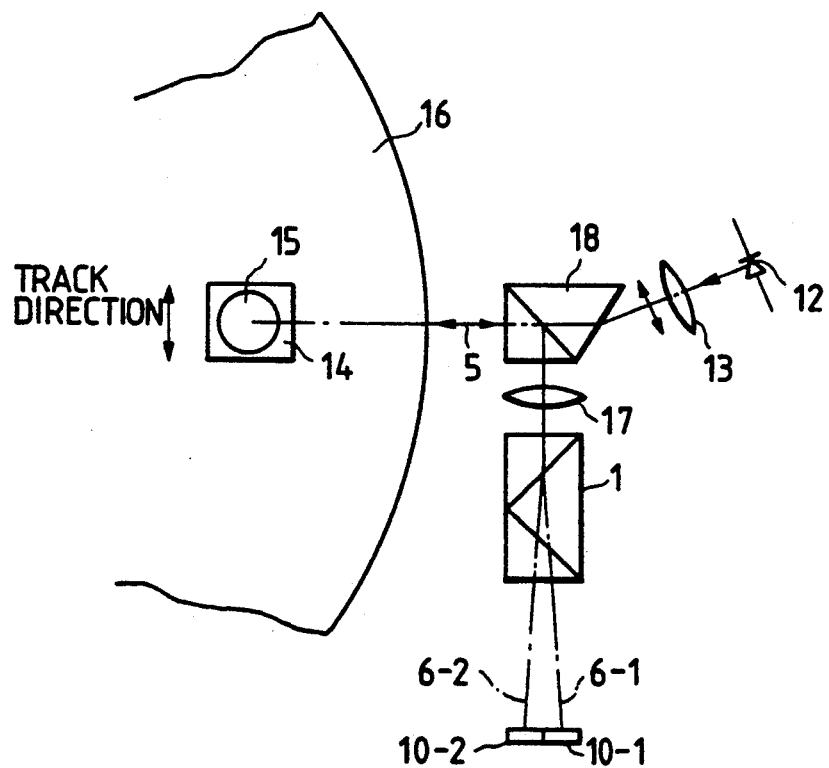
FIG. 10 shows a plan view of another optical head for the magneto-optical information reproducing apparatus which uses the light beam split element of the present invention.

FIG. 10 shows another embodiment of the optical head for the magneto-optical information reproducing apparatus of the present invention. The linearly polarized light beam emitted from the semiconductor laser 12 is collimated by the collimator lens 13. The polarization direction of the semiconductor laser is in the plane of the drawing. The polarization beam splitter 18 has a beam reshaping function so that the incident light is reshaped into a light beam having a substantially isotropic intensity distribution. In order to attain a high quality magneto-optical reproduction signal, the characteristic of the polarization beam splitter has a P-polarization transmittance $t_p = 80\%$ and an S-polarization transmittance $t_s = 0\%$. The light beam transmitted through the polarization beam splitter 18 is directed to the mirror 14. The reflected light beam which contains the magneto-optical signal information on the recording medium 16 is again directed to the polarization beam splitter 18 through a path which is similar to that of the embodiment of FIG. 6. The magneto-optical signal information is the S-polarization component for the polarization beam splitter 18. Since the S-polarization component is reflected substantially 100% and the P-polarization component is reflected 20% by the polarization beam splitter, the amplification of the Kerr effect takes place and a high S/N ratio is attained.

The light beam directed to the light beam split element 1 through the lens 17 is split into the light beams 6-1 and 6-2 having two orthogonal polarization components as it is in the embodiment of FIG. 6, and they are focused onto the photo-detectors 10-1 and 10-2.

In the present apparatus, the deviation of the angle of the light beams 6-1 and 6-2 split by the light beam split element 1 is very small even if the wavelength of the semiconductor laser 12 varies with the temperature or the output. Accordingly, the deviation of the light beam on the photo-detector is small and the stable and correct reproduction of the magneto-optical signal is attained.

In the optical head for the magneto-optical information reproducing apparatus which uses the light beam split element comprising the crystal and the two glasses, the refractive indices, the scatterings and the joint angles of the crystal and the glasses are selected such that the deviation of the light beam exit angle from the light beam split element is sufficiently small even if the wavelength of the semiconductor laser which is the light source varies with the temperature or the output, and the deviation of the light beam on the photo-detector which detects the servo signal is sufficiently small. Accordingly, the magneto-optical signal information can be correctly and stably reproduced. The polarization beam splitter and the light beam split element can be integrated by vapor-depositing the polarization beam splitter on the joint plane of the glass and the crystal so that the reduction of weight, size and cost of the optical head is facilitated.

What is claimed is:

1. An optical head for a magneto-optical information reproducing apparatus comprising:
   a semiconductor laser for emitting a light beam in a polarization direction;
   focusing means for focusing the light beam from said semiconductor laser in a direction of incidence into a fine spot onto a magneto-optical recording medium; and
   light beam splitting means for splitting a light beam reflected by the recording medium into a first light beam having a polarization component in a first direction, substantially 45 degrees with respect to the polarization direction of said semiconductor laser, and into a second light beam having a polarization component in a direction orthogonal to the first direction, said light beam splitting means comprising a first glass, a uniaxial crystal and a second glass arranged in this sequence in the direction of incidence of the light beam from said semiconductor laser,
   wherein normal lines to joint planes of said first glass and said uniaxial crystal, and said second glass and said uniaxial crystal, respectively, are in a plane containing the first and second light beams and an optical axis of said uniaxial crystal is set in the first direction.

2. An optical head for a magneto-optical information reproducing apparatus according to claim 1, wherein said first and second glasses and said uniaxial crystal have such refractive indices, dispersions and joint angles that light beam exit angles are substantially constant irrespective of changes in wavelength of the light beam from said semiconductor laser.

3. An optical head for a magneto-optical information reproducing apparatus according to claim 1, wherein a polorization beam splitter is vapor-deposited on the joint plane of said first glass and said uniaxial crystal.

4. An optical head for a magneto-optical information reproducing apparatus according to claim 1, wherein the first and second light beams split by said light beam splitting means are substantially parallel to the light beam incident to said light beam splitting means and reflected from the recording medium.

5. A magneto-optical information reproducing apparatus, comprising:
   a semiconductor laser for emitting a light beam in a polarization direction;
   focusing means for focusing the light beam from said semiconductor laser in a direction of incidence into a fine spot onto a magneto-optical recording medium;
   light beam splitting means for splitting a light beam reflected by the recording medium into a first light beam having a polarization component in a first direction, substantially 45 degrees with respect to the polarization direction of said semiconductor laser, and into a second light beam having a polarization component in a direction orthogonal to the first direction, said light beam splitting means comprising a first glass, a uniaxial crystal and a second glass arranged in this sequence in the direction of incidence of the light beam from said semiconductor laser,
   wherein normal lines to joint planes of said first glass and said uniaxial crystal, and said second glass and said uniaxial crystal, respectively, are in a plane containing the first and second light beams, and an optical axis of said uniaxial crystal is set in the first direction; and
   detecting means for detecting the first and second light beams split by said light beam splitting means.

6. An apparatus according to claim 5, wherein said first and second glasses and said uniaxial crystal have such refractive indices, dispersions and joint angles that light beam exit angles are substantially constant irrespective of changes in wavelength of the light beam from said semiconductor laser.

7. An apparatus according to claim 5, wherein a polarization beam splitter is vapor-deposited on the joint plane of said first glass and said uniaxial crystal.

8. An apparatus according to claim 5, wherein the first and second light beams split by said light beam splitting means are substantially parallel to the light beam incident to said light beam splitting means and reflected from the recording medium.

9. An apparatus according to claim 5, wherein said detecting means comprises a plurality of detectors for detecting a magneto-optical signal and a servo signal.

* * * * *

UNITED STATES PATENT AND TRADEMARK OFFICE
CERTIFICATE OF CORRECTION

PATENT NO. : 5,293,371
DATED : March 8, 1994
INVENTOR(S) : Osamu KOYAMA

It is certified that error appears in the above-indentified patent and that said Letters Patent is hereby corrected as shown below:

COLUMN 1:

Line 53, "wallastone" should read --Wollaston--; and
    Line 68, "wallastone" should read --Wollaston--.

COLUMN 2:

Line 1, "wallastone" should read --Wollaston--;
    Line 9, "walla-" should read --Wolla--;
    Line 10, "stone" should read --ston--; and
    Line 46, "wallastone" should read --Wollaston--.

COLUMN 4:

Line 16, "met;" should read --met:--.

COLUMN 5:

Line 30, "20%" should read --20%.--.

COLUMN 7:

Line 47, "0" should be deleted.

UNITED STATES PATENT AND TRADEMARK OFFICE
CERTIFICATE OF CORRECTION

PATENT NO. : 5,293,371
DATED : March 8, 1994
INVENTOR(S) : Osamu KOYAMA

It is certified that error appears in the above-indentified patent and that said Letters Patent is hereby corrected as shown below:

COLUMN 8:

Line 48, "the" should be deleted.

COLUMN 12:

Line 30, "polorization" should read --polarization--.

Signed and Sealed this

Twentieth Day of September, 1994

Attest:

BRUCE LEHMAN

Attesting Officer

Commissioner of Patents and Trademarks